United States Patent [19]

Petrasch et al.

[11] Patent Number: 4,747,260
[45] Date of Patent: May 31, 1988

[54] FIELD CHOPPER/BLOWER WITH GROUND-FOLLOWING INTAKE

[75] Inventors: Günter Petrasch, Bischofswerda; Lutz Müller; Dieter Berth, both of Neustadt; Hans P. Spaida, Oppach, all of German Democratic Rep.

[73] Assignee: Veb Kombinat Fortschritt Landmaschinen, Neustadt/Sachsen, German Democratic Rep.

[21] Appl. No.: 942,532

[22] Filed: Dec. 16, 1986

[30] Foreign Application Priority Data

Dec. 17, 1985 [DD] German Democratic Rep. ... 284418

[51] Int. Cl.⁴ ............................................. A01D 49/00
[52] U.S. Cl. ...................................... 56/505; 56/14.3; 56/14.5; 241/101.7
[58] Field of Search ...................... 56/14.3, 13.4, 13.3, 56/60, 61, 500, 503, 504, 505; 241/101.7, 222

[56] References Cited

U.S. PATENT DOCUMENTS

| | | | |
|---|---|---|---|
| 3,357,467 | 12/1967 | Morkoski | 56/60 |
| 3,431,712 | 3/1969 | Pröbsting | 241/222 |
| 3,530,650 | 9/1970 | Phillips | 56/14.3 |
| 4,505,434 | 3/1985 | Martenas et al. | 241/101.7 |

Primary Examiner—Paul J. Hirsch
Assistant Examiner—Marie Britt
Attorney, Agent, or Firm—Karl F. Ross; Herbert Dubno; Andrew Wilford

[57] ABSTRACT

A field chopper has a frame adapted to travel along the ground in a normal travel direction, a main housing fixed on the frame and defining a chopping chamber extending along an axis transverse to the direction and having relative to the direction a front radially open intake opening and a rear outlet angularly offset therefrom, and an intake housing having a front end turned forward away from the frame. This intake housing is pivotal on the main housing or the frame about the axis. A stationary counterblade is carried on the intake housing to one angular side of the intake opening. A rotary cutting/chopping drum rotatable in the chamber about the axis has a blade orbitable immediately adjacent the stationary counterblade. Crop is cut at the the front end of the intake housing and conveyed back in the intake housing from the cutter to the intake opening. A drive rotates the drum and thereby chops crop delivered to the intake opening by the conveyor and also blows the chopped crop out of the chamber through the outlet. Shields surrounding the intake opening are carried on the housings.

6 Claims, 2 Drawing Sheets

FIELD CHOPPER/BLOWER WITH GROUND-FOLLOWING INTAKE

FIELD OF THE INVENTION

The present invention relates to a field chopper with a built-in blower. More particularly this invention concerns such a chopper where the same drum serves both for chopping and blowing of the chopped crop.

BACKGROUND OF THE INVENTION

A field chopper basically has a normally automotive frame adapted to travel along the ground in a normal travel direction and having a front end provided with an intake device, some element that cuts a standing crop. A conveyor displaces the cut crop back on the frame to a chopper which is typically constituted as a large bladed drum. The chopped crop is typically then blown through a chute to a takeoff vehicle, for instance a large wagon towed alongside the chopper.

In the machine sold as model E280 by VEB Kombinat Fortschritt Landmaschinen the chopping unit is fixed on the machine frame and the intake device is suspended so that it can move up and down relative to this frame, thereby accurately following the ground and cutting the crop as low as possible. When the intake unit is very long and wide the output end of this unit can move quite a lot relative to the following conveyor and/or chopper. As a result transfer at this location is inefficient and can even lead to significant loss of crop.

It is possible to separate the chopping drum and the downstream conveyor as described in West German patent document No. 2,438,361 and to make the chopper unit movable in the vehicle frame. The chopper unit moves with the intake device in this case so there are no transfer problems between these subassemblies. On the other hand, however, there are transfer problems between the chopping unit and the output blower, so that this conveyor must be overdimensioned to do its job, once again wasting energy.

The machine sold as model Jaguar 690/675 by Firma Class OHG is a variation on this system wherein the chopping drum is also a conveyor fan. Since here also the output opening or chute does not move with the chopper/conveyor drum it is necessary to provide an auxiliary conveyor in the output chute to prevent the machine from jamming.

OBJECTS OF THE INVENTION

It is therefore an object of the present invention to provide an improved field chopper.

Another object is the provision of such a field chopper which overcomes the above-given disadvantages, that is which has a movable intake device and a stationary chopping/conveying drum where crop is moved efficiently and neatly from the intake to an output that does not move with the chopping/conveying drum.

SUMMARY OF THE INVENTION

A field chopper according to the invention has a frame adapted to travel along the ground in a normal travel direction, a main housing fixed on the frame and defining a chopping chamber extending along an axis transverse to the direction and having relative to the direction a front radially open intake opening and a rear outlet angularly offset therefrom, and an intake housing having a front end turned forward away from the frame. This intake housing is pivotal on the main housing or the frame about the axis. A stationary blade is carried on the intake housing to one angular side of the intake opening. A rotary cutting/chopping drum rotatable in the chamber about the axis has a blade orbitable immediately adjacent the stationary blade. Crop is cut at the front end of the intake housing and conveyed back in the intake housing from the cutter to the intake opening. A drive rotates the drum and thereby chops crop delivered to the intake opening by the conveyor and also blows the chopped crop out of the chamber through the outlet. Shields surrounding the intake opening are carried on the housings.

With this arrangement pivoting of the front intake housing on the rear main housing does not change any critical relationships. The radial spacing between the orbit of the blades on the drum and the counterblade on the front housing does not change as the front housing pivots on the main housing about the drum axis. Only the angular distance between the intake and outlet changes, but such changes are minor, amounting to plus or minus a few uncritical percentage points, and affect an uncritical dimension since it is only necessary that the drum get the chopped crop up to full rotation speed between the chopping location and the outlet. Typically the act of chopping off the leading ends of the incoming cut crop brings the chopped crop instantly up to the rotation speed of the drum, so that the length of the intake-to-outlet path need only exceed a certain small minimum to be satisfactory.

At the same time the orientation of the output chute need not change. It can be set for the maximum possible efficiency given the blowing capacity of the chopping drum and where the chopped crop is to be taken off. Once set, it will not move as the intake housing bobs up and down and even twists from side to side as it follows the ground, but will remain in its own most effective position.

According to a feature of this invention the main housing has at least adjacent the intake opening a generally cylindrical side wall centered on the axis and a pair of axially spaced end walls. The shields include a lower side shield attached to and extending down from the counterblade and having a lower edge radially within the main-housing side wall. Further shields are end shields substantially blocking the intake opening at the end walls. There is also an upper side shield above the intake opening and having an upper edge outside the main-housing side wall. All of these shields are fixed on the movable front housing and closely hug, nest, or telescope with the respective side and end walls of the main housing at least at their radial outer regions so as completely to stop leakage of crop at the intake opening.

The conveyor according to the invention has drums defining a transport path extending back in the direction from the cutting means to the intake opening. The chopping drum itself has a series of blades that also act as impeller or fan vanes and that therefore extend in planes at least partially radial of the drum axis. In addition the outlet opens tangentially upward on the main housing.

DESCRIPTION OF THE DRAWING

The above and other features and advantages will become more readily apparent from the following, reference being made to the accompanying drawing in which.

SPECIFIC DESCRIPTION

Figure 1:
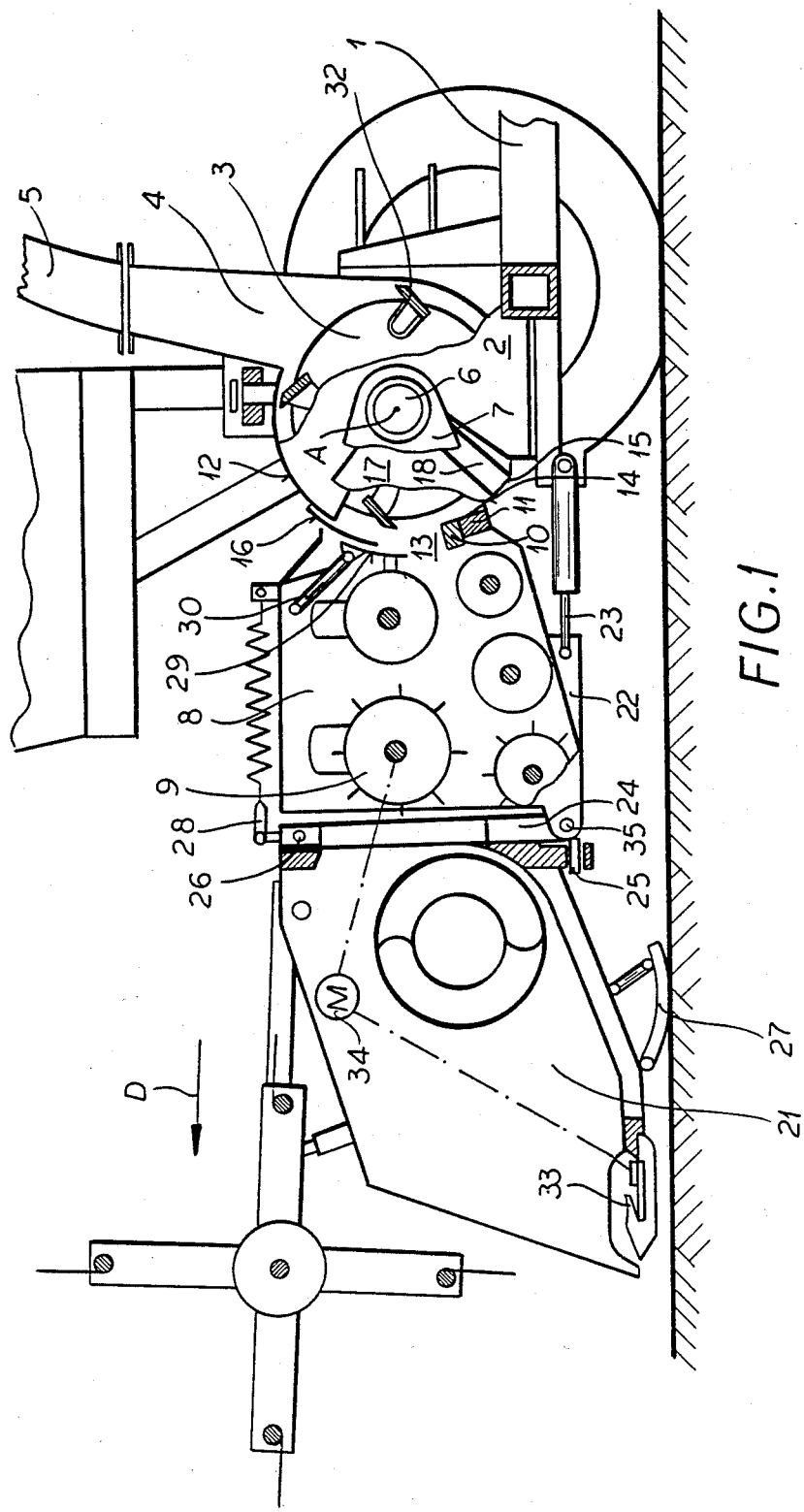
FIG. 1 is a small-scale and partly diagrammatic side view partly in vertical longitudinal section.
Figure 2:
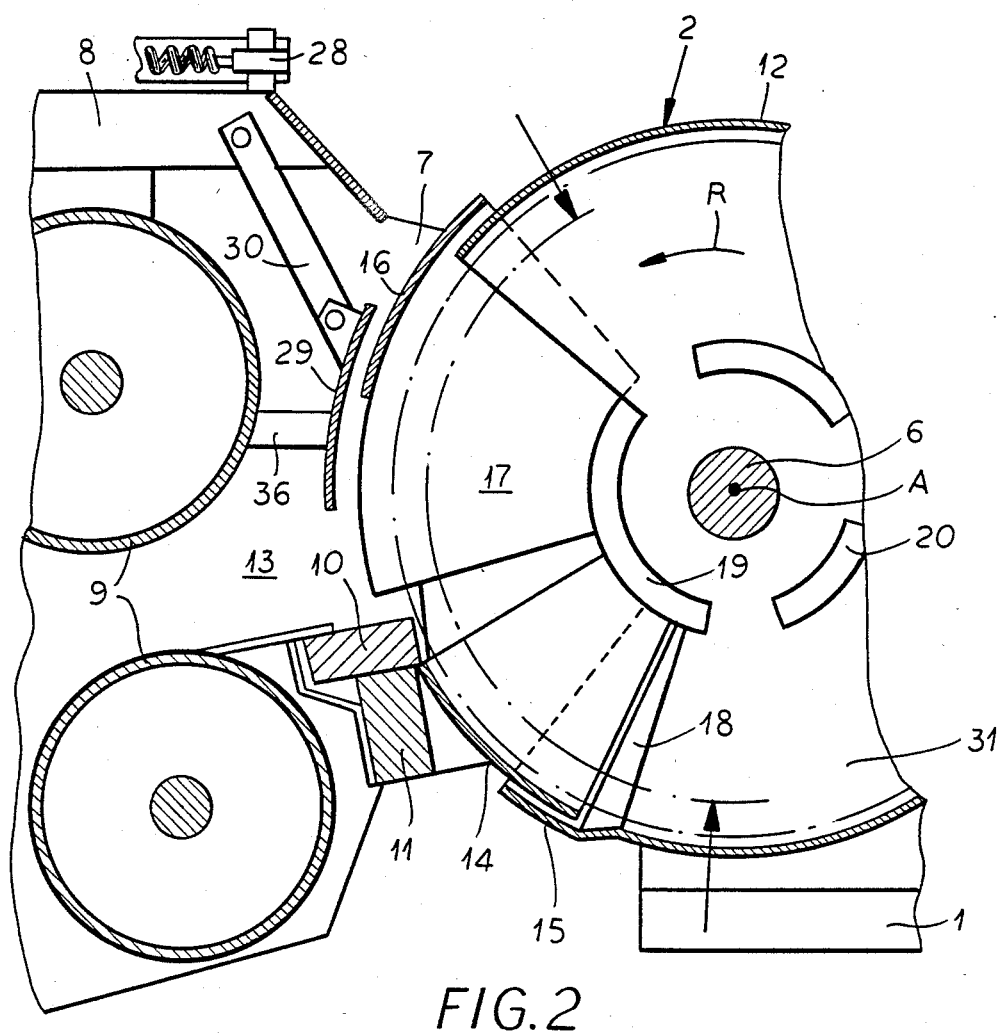
FIG. 2 is a larger-scale view of a detail of FIG. 1.

As seen in FIG. 1 an automotive field harvester/chopper has a frame 1 that normally moves along the ground in a travel direction D. A housing 2 having a cylindrical side wall 12 centered on a horizontal axis A perpendicular to the direction D and flat end walls 31 perpendicular to this axis A is fixed on the frame 1. A chopping/blowing drum 3 having impeller/chopper blades 32 is carried on a shaft 6 centered on the axis A for rotation inside the housing 2 with the blade edges defining a cylindrical orbit spaced radially inward from the side wall 12 of the housing 2. At the rear the side wall 12 of the housing 2 forms a tangentially and upwardly open outlet 4 that connects to a chute 5 that leads to the takeoff truck or wagon. At its front the housing 2 has a horizontally forwardly open intake mouth 13 extending axially across the side wall 12 and back toward the axis A as axially aligned sectors terminating somewhat past the half of the radius of the wall 12.

Two parallel and horizontal support arms 7 have rear ends pivoted on the frame 1 about the axis A and front ends carrying an intake housing 8 having a front part 21 carrying a sickle-bar cutter 33 and a rear part 22 containing upper and lower crusher/transport rollers 9. At its rear end the rear part 22 carries a counterblade 11 support that in turn carries a counterblade 10 that lies virtually on the orbit of the blades 32.

The rear part 22 is fixed on the arms 7 so it can pivot on the frame 1 about the transverse axis A. Cylinders 23 braced between the frame 1 and the rear part 22 can pivot it about this axis A, thereby determining the height of the part 22 above the ground. A tip frame 24 is pivotal on the front end of the rear part 22 about a pin 35 defining an axis forward of, parallel to, and somewhat below the axis A. The frame 24 carries a pin 25 that is axially equispaced between the arms 7, on the centerline of the machine, and carries the front part 21 so that same can rock from side to side on the pin 25 while following minor up and down movements. The front part 21 rides on the ground via runners 27 and diagonal tension springs 28 hooked between the upper end 26 of the frame 24 and the rear part 22 urge the front part into an upright centered position.

A drive 34 is connected as illustrated by dot-dash lines for the cutter 33 and rollers 9 to these elements and to the drum 3 so that, as the machine moves along the ground in the direction D, standing crop in front of it is first knocked down and then cut at the base by the cutter 33. Then the cut crop is crushed and conveyed backward by the rollers 9 to the mouth 13, the upper rollers 9 being upwardly displaceable to conform to the amount of crop being conveyed and crushed. Then the cut crop is chopped between the blades 32 and 10 and the drum 3 blows it up into the outlet 4 and via the chute 5 to the takeoff truck.

During such operation the front end 21 with the cutter 33 follows the ground accurately and any vertical movements of the housing 8 relative to the housing 2 have the sole effect of changing the length of the arcuate travel path for the chopped crop from the location where the blades 32 and 10 meet to the outlet 4. Due to the relatively large diameter of the housing 2 and the relatively small arc the front housing 8 will move through relative to the rear housing 2, the difference in length of travel path is inconsequential. In addition as discussed above, this particular parameter is not a factor having much effect on efficiency.

With the system of this invention leakage is prevented at the mouth 13, that is where the conveyor path for the cut crop passes from the front housing 8 to the rear housing 2, by a series of shields 14, 16, 17, and 29 carried on the housing 8 or its arms 7. The shield 14 is part cylindrical and attached to the counterblade support 11. It is of the same radius of curvature and spacing from the axis A as the side wall 12, which is formed at the lower edge of the mouth 13 with an outwardly offset portion 15 so that the lower edge of the shield 14 can fit within this portion 15 as the housings 2 and 8 move relative to each other about the axis A, thereby blocking any radial leakage at this location. A similar upper shield 16 but of greater radius of curvature than the wall 12 delimits the upper edge of the opening 13 and can move up over the wall 12.

Figure 3:
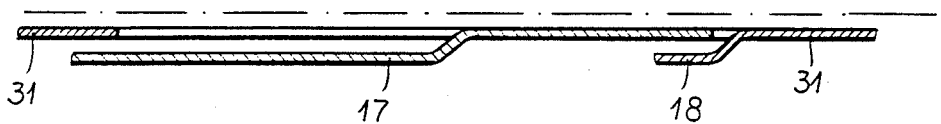
FIG. 3 is a section taken along the curved dot-dash line indicated by arrows in FIG. 1, seen radially inward.

The end shields 17 have upper portions as seen to the left in FIG. 3 that are spaced axially more than the end walls 31 and lower portions of the same spacing, and the end walls 31 are formed with laterally offset portions 18 into which the lower portions of the end shields 17 can fit. These shields 17 are fixed on the arms 7 or housing 8 and end radially inward somewhat outward from the innermost edge of the mouth 13, so as to form an arcuate opening 19 which, with similar openings 20 formed in the end walls 31, allows the drum 3 to draw air into the housing 2.

The shield 29 is mounted on an arm 30 on the housing 8 and comes somewhat down below the lower edge of the shield 16. Another arm 36 is connected to the downstream upper roller 9 so this shield 29 can follow its vertical movement.

These shields 14, 16, 17, and 29 therefore accurately delimit the edges of the intake opening 13, preventing crop loss at this transfer point between two relatively moving structures. The system therefore has the capacity and good crop-conveying properties of a system with the chopping and conveying drum fixed on the chassis 1, while still having the flexibility of a machine with a long intake device that can accurately follow the ground by moving relative to the chassis.

We claim:

1. A field chopper comprising:
   a frame adapted to travel along the ground in a normal travel direction;
   a main housing fixed on the frame and defining a generally cylindrical chopping chamber centered on an axis transverse to the direction and having relative to the direction a front radially open intake opening and a rear outlet angularly offset therefrom;
   an intake housing separate from the main housing and, having a front end turned forward away from the frame;
   pivot means supporting the intake housing for pivoting on the frame relative to the main housing about the axis;
   a counterblade
   fixed on the intake housing,
   defining one angular side of the intake opening, and
   movable about the axis relative to the main housing jointly with the intake housing;

a rotary cutting/chopping drum rotatable in the chamber about the axis and having a blade orbitable immediately adjacent the counterblade regardless of the relative angular positions of the housings;

means at the front end of the intake housing for cutting crop;

conveyor means including conveyor elements mounted in the intake housing between the cutter means and the intake opening for conveying the cut crop in the intake housing from the cutter means to the intake opening;

drive means for rotating the drum and thereby chopping crop delivered to the intake opening by the conveyor means and for conveying the chopped crop out of the chamber through the outlet; and shields surrounding the intake opening and carried on the housings.

2. The field chopper defined in claim 1 wherein the main housing has a generally cylindrical side wall centered on the axis and a pair of axially spaced end walls.

3. The field chopper defined in claim 2 wherein the shields include a lower side shield attached to and extending down from the counterblade and having a lower edge radially within the main-housing side wall.

4. The field chopper defined in claim 2 wherein the intake opening is cut into the end walls and the shields include end shields substantially blocking the intake opening at the end walls.

5. The field chopper defined in claim 2 wherein the shields include an upper side shield above the intake opening and having an upper edge outside the main-housing side wall.

6. The field chopper defined in claim 1 wherein the conveyor elements are drums defining a transport path extending back in the direction from the cutting means to the intake opening.

* * * * *